(No Model.)
H. DETAMBLE.
BOB SLEIGH.
No. 293,152. Patented Feb. 5, 1884.
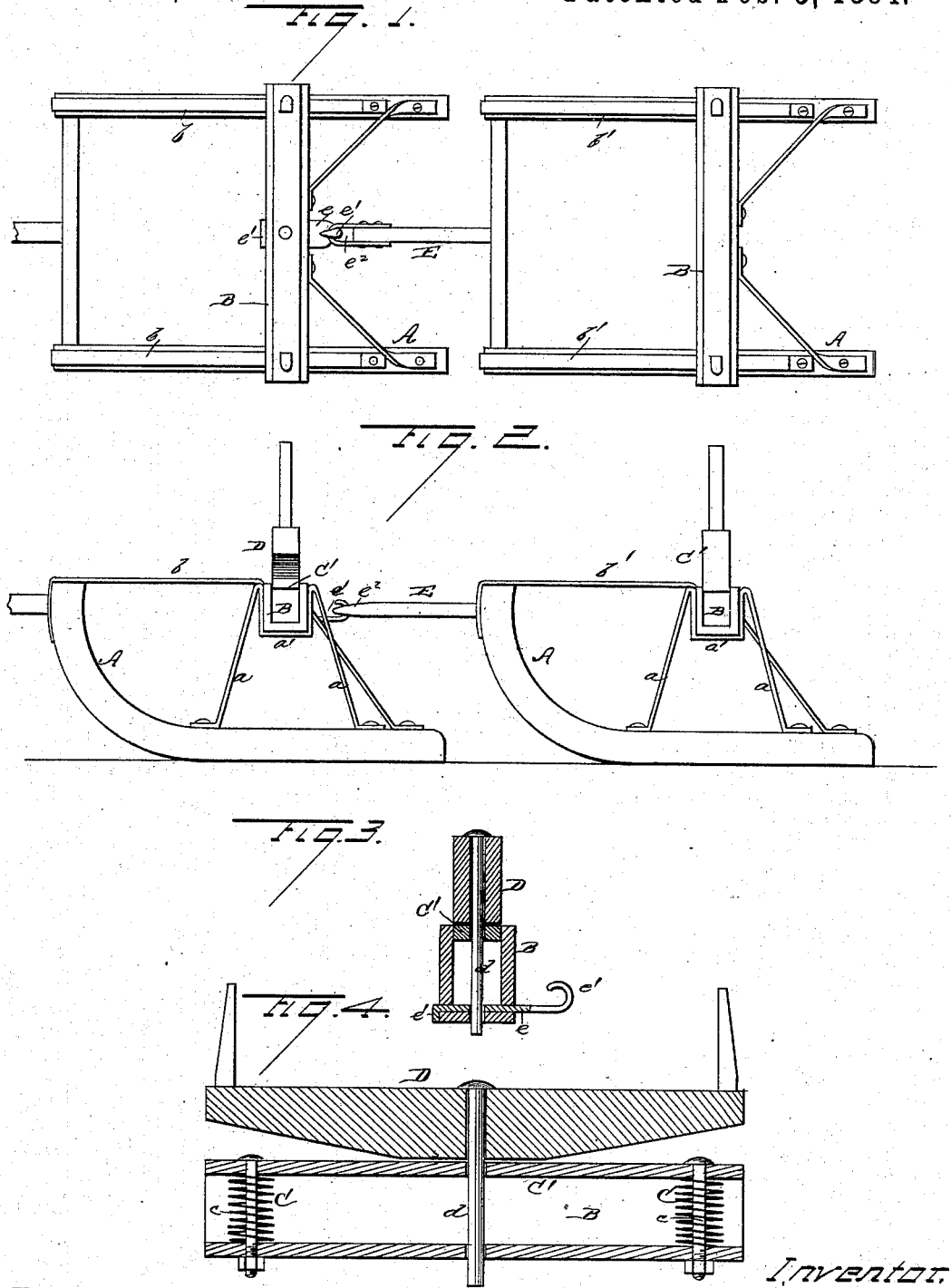
Witnesses:
H. C. McArthur
Chas Kressmann
Inventor.
Henry Detamble
per H Harrison
Attorney.

UNITED STATES PATENT OFFICE.

HENRY DETAMBLE, OF AURORA, ILLINOIS.

BOB-SLEIGH.

SPECIFICATION forming part of Letters Patent No. 293,152, dated February 5, 1884.

Application filed December 13, 1883. (No model.)

*To all whom it may concern:*

Be it known that I, HENRY DETAMBLE, a citizen of the United States, residing at Aurora, in the county of Kane and State of Illinois, have invented certain new and useful Improvements in Bob-Sleighs, of which the following is a specification, to wit:

This invention relates to an improvement in bob-sleds; and it consists in the peculiar construction and arrangement of the same, substantially as will be hereinafter described and claimed.

In order to enable others skilled in the art to which my invention relates to make and use the same, I will now proceed to describe its construction and operation, referring to the accompanying drawings, in which—

Figure 1 is a plan view, Fig. 2 a side elevation, and Figs. 3 and 4 are detail sectional views, of my invention.

A A represent the runners of the forward and rear sleds, upon which are secured braces $a\ a$, formed with a deep bend, $a'$, in which rests an open-top box or case, B, which extends across the device from side to side, and is suitably braced by metal straps $b\ b'$ from the points of the runners and to their rear ends, as shown. In each box or trough B is placed a pair of spiral springs, C C, which support a cross-bar, $C'$, as shown, and confined in place by rods $c\ c$. Upon the forward cross-bar is also placed a bolster, D, swiveled by a king-bolt, $d$, passing down through the center of the trough B, and upon this bolster and the rear cross-bar the bed of the sleigh is intended to rest, as will be clearly understood by reference to the drawings. Through the lower central portion of the forward trough or box, B, is passed a metal strap, $e$, having its forward end turned down to engage with the box and remove all strain from the king-bolt, which passes through this strap. The rear end of the strap $e$ is formed with a hook, $e'$, to which the tongue or reach E of the rear sled is engaged by an eye, $e^2$, on its end.

The operation of this device is so simple as to be readily seen without further description. It is evident that when desired the bolster D and cross-bars $C'$ may be removed, together with their supporting-springs, and the bed and gear of a vehicle placed upon the sleds, the axles resting in the troughs B B and being securely held therein. The boxes B are securely supported by the continuous braces $a\ a$, which pass around three sides of the box and brace it, while holding it against being torn apart by any sudden strain.

Having thus fully described my invention, what I claim as new, and desire to secure by Letters Patent, is—

1. In a bob-sled, the runners A, continuous braces $a\ a$, formed with a deep bend, $a'$, and open troughs or boxes B B, in combination with the cross-bars $C'$, springs C, and rods $c\ c$, substantially as and for the purpose set forth.

2. In a bob-sled, the combination, with the runners A and the braces $a\ a$, of the troughs or boxes B, adapted to receive the axles of a wagon, substantially as and for the purpose set forth.

3. In a bob-sled, a reach-coupling consisting of a metal strap or plate passed through the knee of the forward sled and bent or flanged at its forward end, and formed with a hook at its rear end, whereby all strain is removed from the king-bolt, substantially as and for the purpose set forth.

In testimony whereof I affix my signature in presence of two witnesses.

HENRY DETAMBLE.

Witnesses:
W. C. MCARTHUR,
CHAS. KRESSMAN.